United States Patent
Kubo et al.

(10) Patent No.: US 11,987,862 B2
(45) Date of Patent: May 21, 2024

(54) METHOD FOR LIQUEFYING NIOBIUM AND TANTALUM, AND METHOD FOR PRODUCING NIOBIUM SOLUTION AND TANTALUM SOLUTION

(71) Applicant: Fukuoka Institute of Technology, Fukuoka (JP)

(72) Inventors: Hironari Kubo, Fukuoka (JP); Takuto Nishida, Fukuoka (JP); Sayaka Masuda, Fukuoka (JP)

(73) Assignee: Fukuoka Institute of Technology, Fukuoka (JP)

( * ) Notice: Subject to any disclaimer, the term of this patent is extended or adjusted under 35 U.S.C. 154(b) by 0 days.

(21) Appl. No.: 18/278,826

(22) PCT Filed: Feb. 9, 2022

(86) PCT No.: PCT/JP2022/005190
§ 371 (c)(1),
(2) Date: Aug. 24, 2023

(87) PCT Pub. No.: WO2022/196197
PCT Pub. Date: Sep. 22, 2022

(65) Prior Publication Data
US 2024/0084417 A1 Mar. 14, 2024

(30) Foreign Application Priority Data
Mar. 15, 2021 (JP) .................. 2021-041753

(51) Int. Cl.
*C22B 3/00* (2006.01)
*C22B 3/06* (2006.01)
(Continued)

(52) U.S. Cl.
CPC .............. *C22B 3/06* (2013.01); *C22B 3/22* (2013.01); *C22B 34/24* (2013.01)

(58) Field of Classification Search
None
See application file for complete search history.

(56) References Cited

U.S. PATENT DOCUMENTS 4,923,507 A * 5/1990 Silva Filho ......... C22B 34/1222
423/489
6,592,830 B1 * 7/2003 Krupin ................... C22B 7/006
423/67

FOREIGN PATENT DOCUMENTS

JP 58-176128 A 10/1983
JP 62-185841 A 8/1987
(Continued)

OTHER PUBLICATIONS

Hashiba. Minoru et al., Decomposition of aluminum oxide. titanium (IV) oxide and niobium(V) oxide by fusion with ammonium sulfate., Bunseki Kagaku, May 5, 1980.

*Primary Examiner* — Stefanie J Cohen
(74) *Attorney, Agent, or Firm* — Heedong Chae; Lucem, PC

(57) ABSTRACT

A method for liquefying niobium and tantalum and a method for producing a niobium solution and a tantalum solution, which can liquefy niobium and tantalum or produce a niobium solution and a tantalum solution safely and efficiently from a smelting raw material containing niobium and tantalum. Ammonium hydrogen sulfate is mixed as a reaction agent into a powdered substance containing at least one element of niobium or tantalum, and the mixture is melted under predetermined conditions to form a molten substance. A suspension formed by dissolving the molten substance having been solidified in an aqueous solution is subjected to solid-liquid separation to recover a precipitate. The precipitate is composed of niobium and/or tantalum with few impurities, and the precipitate is dissolved in one type of acid solution selected from hydrochloric acid, sulfuric acid, (Continued)

or nitric acid, whereby 90% or more of niobium and/or tantalum can be leached out.

9 Claims, 6 Drawing Sheets

(51) Int. Cl.
  *C22B 3/22* (2006.01)
  *C22B 34/24* (2006.01)

(56) References Cited

FOREIGN PATENT DOCUMENTS

| | | |
|---|---|---|
| JP | 62-241824 A | 10/1987 |
| JP | 2002-316822 A | 10/2002 |

* cited by examiner

[FIG. 1]
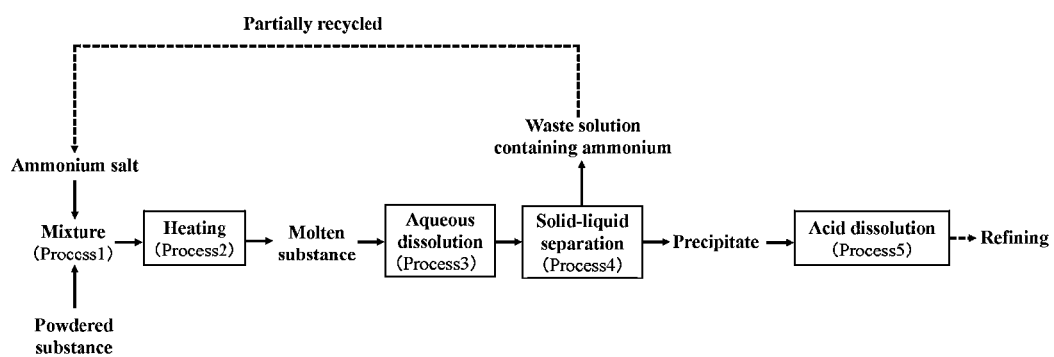

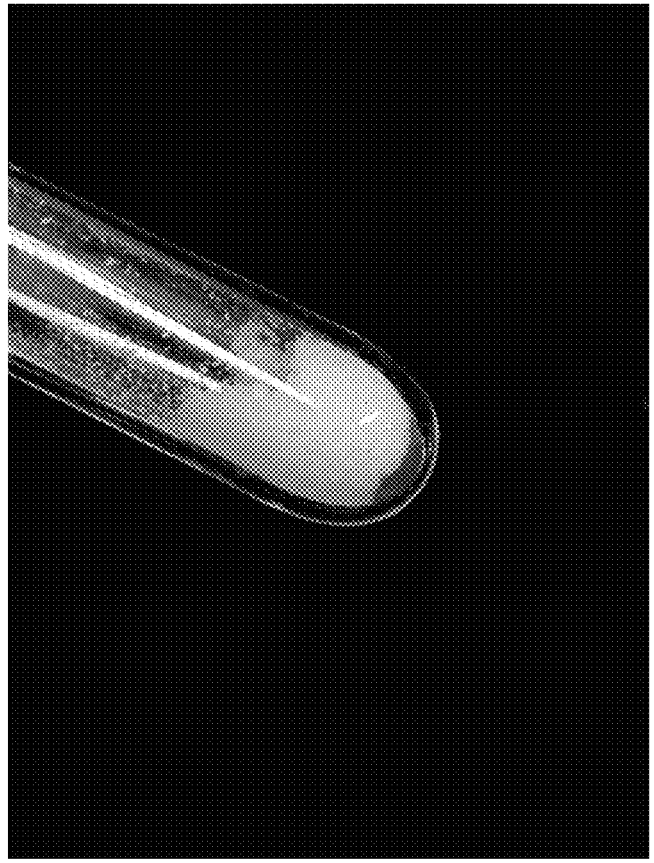
[FIG. 2]

[FIG. 3]
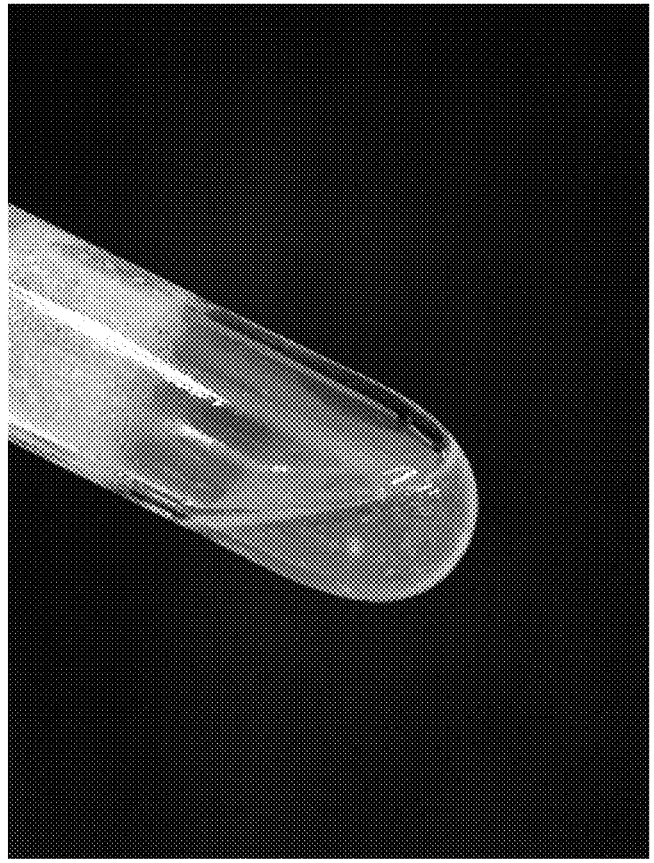

[FIG. 4]
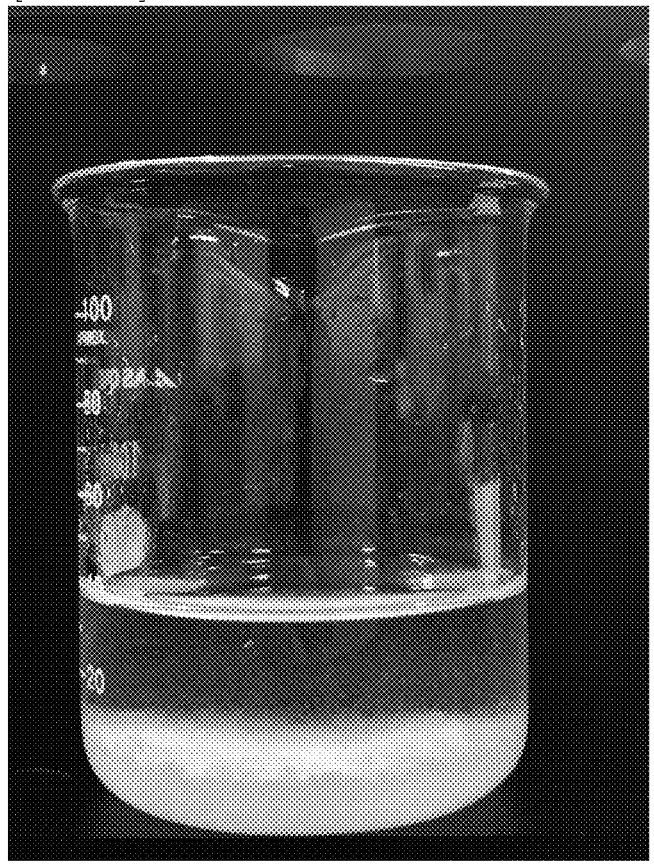

[FIG. 5]

[FIG. 6]
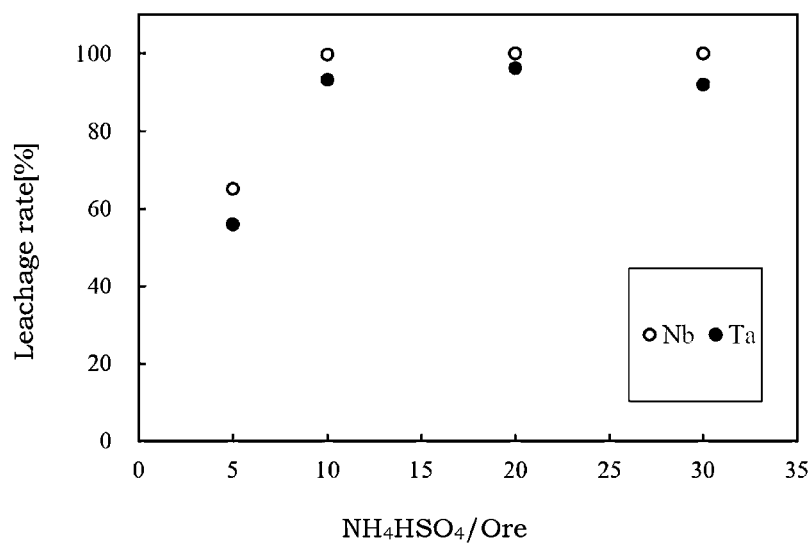

METHOD FOR LIQUEFYING NIOBIUM AND TANTALUM, AND METHOD FOR PRODUCING NIOBIUM SOLUTION AND TANTALUM SOLUTION

TECHNICAL FIELD

The present invention relates to a method for liquefying niobium and tantalum and a method for producing a niobium solution and a tantalum solution. Specifically, the present invention relates to a method for liquefying niobium and tantalum and a method for producing a niobium solution and a tantalum solution, which can liquefy niobium and tantalum or produce a niobium solution and a tantalum solution safely and efficiently from a smelting raw material containing niobium and tantalum.

BACKGROUND ART

In recent years, niobium and tantalum have been used in various applications as electronic materials. For example, solid electrolytic capacitors with anode electrodes formed from tantalum have been rapidly and widely used as components of cellular phones, personal computers, and the like due to their small size but large capacity. Further, niobium, which is a congener of tantalum, is less expensive and has a higher dielectric constant than tantalum, so that it has been studied for use in anode electrodes. The anode electrodes are formed by sintering tantalum powder and niobium powder into porous sintered bodies and subjecting the porous sintered bodies to chemical conversion and oxidation.

Incidentally, it is known that since niobium and tantalum are similar in their chemical properties as described above, the two metals coexist in ore and their separation is difficult. As a method for recovering niobium and tantalum from ore to produce niobium oxide and tantalum oxide, a liquefaction treatment method using hydrofluoric acid has generally been proposed (Patent Literature 1 and Patent Literature 2).

For example, a liquefaction treatment method disclosed in Patent Literature 2 will be described. An ore such as tantalite and a raw material such as iron scrap are pulverized and dissolved in hydrofluoric acid, and then, sulfuric acid is added to adjust the concentration of the solution. The adjusted solution is next filtered through a filter press to form a clean solution and subjected to solvent extraction with MIBK (methyl isobutyl ketone), with which niobium and tantalum are extracted into MIBK. At this time, impurities such as iron, manganese, and silicon contained in the raw material remain in the raffinate, whereby the impurities are removed.

Back extraction of the thus obtained MIBK containing niobium and tantalum with dilute sulfuric acid transfers the niobium to the aqueous solution and leaves pure tantalum in the MIBK. The tantalum in the MIBK is refined, back-extracted with water, and transferred to the aqueous solution to recover and reuse the MIBK. On the other hand, the niobium in the aqueous solution is extracted again with MIBK and the tantalum contained therein in a small amount is extracted to refine the niobium in the aqueous solution into a pure one. The MIBK at the time of niobium refinement is joined to the solvent before the separation of niobium and tantalum. An addition of an aqueous ammonia to the thus refined niobium solution and tantalum solution precipitates niobium hydroxide and tantalum hydroxide. Further, the hydroxide precipitate is filtered, dried, and finally calcined to obtain niobium oxide and tantalum oxide.

CITATION LIST

Patent Literature

Patent Literature 1: Japanese Unexamined Patent Application Publication No. S58-176128
Patent Literature 2: Japanese Unexamined Patent Application Publication No. 2002-316822

SUMMARY OF INVENTION

Technical Problem

Incidentally, hydrofluoric acid used in the foregoing Patent Literature 1 and Patent Literature 2 is an industrially important chemical substance. However, hydrofluoric acid is a substance that is very dangerous to handle because contact therewith poses a risk of significantly corroding an affected part and can lead to a fatal accident in the worst case, therefore, hydrofluoric acid is designated as a poisonous substance under Poisonous and Deleterious Substances Control Act in Japan.

Further, fluorite ($CaF_2$), which is a raw material for hydrofluoric acid, cannot be produced in Japan, and fluorite or its primary processed products are imported from other countries under the present circumstances. However, in recent years, due to the stockpiling of resources by various countries, the price of particularly high-purity products has surged, making it difficult to stably secure quality and quantity.

The present invention was invented in view of the foregoing points, and relates to a method for liquefying niobium and tantalum and a method for producing a niobium solution and a tantalum solution, which can liquefy niobium and tantalum or produce a niobium solution and a tantalum solution safely and efficiently from a smelting raw material containing niobium and tantalum.

Solution to Problem

In order to achieve the foregoing object, a method for liquefying niobium and tantalum of the present invention includes the steps of forming a molten substance in which an ammonium salt is mixed into a powdered substance containing at least one element of niobium or tantalum, dissolving the molten substance having been solidified in a predetermined amount of solvent to form a suspension, subjecting the suspension to solid-liquid separation into a precipitate and a liquid, and dissolving the precipitate by reaction with an acid solution.

Further, a method for producing a niobium solution and a tantalum solution of the present invention includes the steps of forming a molten substance in which an ammonium salt is mixed into a powdered substance containing at least one element of niobium or tantalum, dissolving the molten substance having been solidified in a predetermined amount of solvent to form a suspension, subjecting the suspension to solid-liquid separation into a precipitate and a liquid, and dissolving the precipitate by reaction with an acid solution.

Here, by providing the step of forming a molten substance in which an ammonium salt is mixed into a powdered substance containing at least one element of niobium or tantalum, as will be described later, the mixture can be melted to cause the ammonium salt to react with the powdered substance and changed into a chemical form that is soluble in acids other than hydrofluoric acid. At this time, due to the fact that the substance containing at least one element of niobium or tantalum is in the form of powder, the reaction rate with the ammonium salt can be promoted.

Further, when the step of forming the molten substance includes a step of forming a mixture in which a powder form of the ammonium salt is mixed into the powdered substance, the reaction between the powdered substance and the ammonium salt can be promoted by heating the resulting mixture.

Further, when the step of forming the molten substance includes a step of forming a mixture in which the powdered substance and a molten form of the ammonium salt are mixed, the reaction between the powdered substance and the ammonium salt can be promoted by further heating the mixture in which the powdered substance is mixed into the previously melted ammonium salt.

Further, by providing a step of melting the mixture under predetermined conditions to form a molten substance, the powdered substance containing niobium or tantalum and the ammonium salt contained in the mixture can be reacted to form the molten substance. Here, the substance containing niobium or tantalum forms a rigid oxide solid solution, but high chemical activity of the thermally decomposed ammonium salt can break the bonds of the oxide solid solution and change it into a substance that is soluble also in common acids other than hydrofluoric acid.

Further, by providing the step of dissolving the molten substance having been solidified in a predetermined amount of solvent to form a suspension, unreacted ammonium salt and other impurities can be dissolved in a solvent such as an aqueous solution. The suspension formed at this time can be easily separated into a precipitate and a liquid by solid-liquid separation, which will be described later.

Further, by providing the step of subjecting the suspension to solid-liquid separation into a precipitate and a liquid, the precipitate obtained by the solid-liquid separation becomes a compound containing niobium or tantalum close to a pure state in which most impurities have been removed, and thus becomes a substance soluble in common acids. On the other hand, the liquid can be disposed of as an ammonium-containing waste solution or can be recycled and reused as an ammonium salt.

Further, by providing the step of dissolving the precipitate in an acid solution, the precipitate is in the form of a substance soluble also in common acids, as described above, so that the precipitate can be easily dissolved and liquefied without using, for example, hydrofluoric acid, which is a highly dangerous acid. The solution containing the liquefied niobium or tantalum can be subjected to mutual separation and reduction through, for example, a refining process, and processed into products such as metals, oxides, and fluorides.

Further, when the step of forming the mixture includes mixing the ammonium salt in a weight ratio of about twice or more relative to the powdered substance, the reaction with the powdered substance containing niobium or tantalum can be promoted to make the powdered substance be a molten substance.

The larger the amount of ammonium salt to be mixed, the higher the reaction rate. However, the heating energy and the amount of wastewater increase in proportion to the amount of ammonium salt used, and a large-scale reaction vessel is also required for use in the reaction. Accordingly, the upper limit of the ammonium salt to be mixed can be appropriately changed in consideration of the reaction cost.

Further, when the step of forming the molten substance includes heating for a predetermined period of time so that a temperature of the molten substance becomes about 400 to 500° C., the ammonium salt reaches the melting point to liquefy and then is raised in temperature to near the boiling point, thereby allowing the powdered substance to be incorporated into the molten substance. When, for example, ammonium sulfate or ammonium hydrogen sulfate, which will be described later, is used as the ammonium salt, the melting point thereof is approximately 147° C., so that the reaction can be promoted even at a low temperature.

In the case of a heating condition in which the temperature of the molten substance is less than approximately 400° C., it takes a long time for the ammonium salt to reach the melting point (approximately 147° C. for ammonium hydrogen sulfate), and depending on the type of ammonium salt used, the boiling point may not be reached, which may not allow the powdered substance to be incorporated into the molten substance.

Further, in the case of a heating condition in which the temperature of the molten substance is approximately 500° C. or higher, the reaction rate can be accelerated, but there is concern that the energy cost for maintaining the temperature of the molten substance at 500° C. or higher will increase. Accordingly, the heating condition is preferably set so that the temperature of the molten substance is about 400 to 500° C. in order to ensure that the powdered substance is incorporated into the molten substance at a low cost.

Further, when the step of forming the suspension includes using an aqueous solution of about one or more times a weight of the molten substance, unreacted ammonium salt generated in the step of forming the molten substance and the impurities present in the molten substance can be dissolved. The aqueous solution can be appropriately selected from, for example, distilled water, pure water, ion exchanged water, tap water, or dilute acids. Further, the upper limit of the aqueous solution can be appropriately changed in consideration of solid-liquid separation, which is a post-process.

Further, when the ammonium salt is at least one selected from ammonium hydrogen sulfate or ammonium sulfate, the powdered substance can be easily made into a molten substance and the ammonium hydrogen sulfate or ammonium sulfate has high reactivity to niobium and tantalum, so that the precipitate containing niobium or tantalum can be stably liquefied from the powdered substance.

Further, when the acid solution is at least one selected from hydrochloric acid, sulfuric acid, or nitric acid, the liquefaction can be performed using hydrochloric acid, sulfuric acid, or nitric acid, which does not involve any particular risk in handling. This is because the precipitate containing niobium or tantalum close to the pure state in which the impurities have been removed changes to a compound bonded with acid ions, and then reaches a state of being soluble also in common acids.

Further, even when hydrofluoric acid, which has conventionally been used for liquefying chemical substances containing niobium or tantalum, is used, the precipitate containing niobium or tantalum close to the pure state in which the impurities have been removed can be liquefied with a very small amount of hydrofluoric acid. Therefore, the amount of hydrofluoric acid used can be significantly reduced compared with the conventional treatment.

Further, when a step of heating the precipitate at a predetermined temperature to obtain a heated substance is included after the step of subjecting the suspension to solid-liquid separation into a precipitate and a liquid and before the step of dissolving the precipitate by reaction with an acid solution, and the step of dissolving the precipitate by reaction with an acid solution includes a step of dissolving the heated substance with hydrofluoric acid, the heated substance obtained by heating the precipitate is an oxide and thus reacts with hydrofluoric acid as the acid solution. At this time, since the impurities such as sulfur and ammonia contained in the precipitate have been removed by heating, the heated substance can be liquefied with a very small amount of hydrofluoric acid. Therefore, the amount of hydrofluoric acid used can be significantly reduced compared with the conventional treatment.

Advantageous Effects of Invention

The method for liquefying niobium and tantalum and the method for producing a niobium solution and a tantalum solution according to the present invention can liquefy niobium and tantalum or produce a niobium solution and a tantalum solution safely and efficiently from a smelting raw material containing niobium and tantalum.

BRIEF DESCRIPTION OF DRAWINGS

FIG. 1 is a process chart of a method for liquefying niobium and tantalum according to an embodiment of the present invention.

FIG. 2 is an appearance photograph of a state in which ammonium hydrogen sulfate was mixed into a powdered substance.

FIG. 3 is an appearance photograph of a state in which the mixture was heated and became a molten substance.

FIG. 4 is an appearance photograph of a state in which the molten substance was dissolved in an aqueous solution and became a suspension.

FIG. 5 is an appearance photograph of a precipitate obtained by subjecting the suspension to solid-liquid separation.

FIG. 6 is a graph showing the leaching rate of niobium and tantalum depending on the amount of ammonium hydrogen sulfate mixed into the powdered substance.

DESCRIPTION OF EMBODIMENTS

Hereinafter, an embodiment of the present invention will be described in detail with reference to the drawings and the like for understanding of the present invention. In the following description, a method for liquefying niobium and tantalum will be mainly described, but a method for producing a niobium solution and a tantalum solution is also of the same steps.

FIG. 1 shows a process chart of a method for liquefying niobium and tantalum according to an embodiment of the present invention. The method for liquefying niobium and tantalum is mainly composed of the steps of mixing a predetermined amount of ammonium salt into a powdered substance (a smelting raw material) containing a predetermined amount of niobium and tantalum and pulverized into a predetermined particle size to form a mixture (Step 1), heating the mixture having been formed in Step 1 to form a molten substance (Step 2), dissolving the molten substance having been formed by the reaction of Step 2 in an aqueous solution to form a suspension (Step 3), subjecting the formed suspension to solid-liquid separation into a precipitate and an ammonium-containing waste solution (Step 4), and dissolving the precipitate by reaction with an acid solution (Step 5).

Here, the scope of application of the present invention is mainly assumed to be ores. However, it can be applied to, for example, smelting residues such as tin, or scrap materials including waste electronic materials as long as niobium or tantalum is contained, and inclusive thereof, and these are defined as "smelting raw materials". The particle size of pulverized smelting raw materials is not particularly limited, but the smaller the particle size, the more the reaction with the ammonium salt can be promoted.

Further, niobium and tantalum generally coexist in an ore, but the present invention can be applied to a smelting raw material containing at least one element of niobium or tantalum.

Further, the ammonium salt used for the reaction is basically a solid one, but an aqueous solution of the ammonium salt can also be used. At this time, when the aqueous solution of the ammonium salt and a smelting raw material are mixed and heated, moisture is first evaporated, a solid ammonium salt is soon precipitated, and a molten substance is formed. Accordingly, even when the aqueous solution of the ammonium salt is used, the solid ammonium salt is formed in the middle of the reaction and then the reaction is promoted.

Further, for example, ammonium hydrogen sulfate or ammonium sulfate is preferably used as the ammonium salt in terms of promoting the reaction with niobium or tantalum. However, without being limited thereto, the ammonium salt can be appropriately selected from ammonium salts capable of reacting with niobium or tantalum.

As the amount of the ammonium salt used in the reaction, it is preferably used in a weight ratio of about twice or more relative to the smelting raw material as a guide, but should not be limited thereto. However, when the amount of the ammonium salt is less than about two times the smelting raw material in the weight ratio, the reaction does not proceed sufficiently and the smelting raw material may not be able to be incorporated into the molten substance.

The more the ammonium salt, the more the reaction with the smelting raw material is promoted, and the molten substance is easily formed. However, the heating energy and the amount of wastewater for reaction, and furthermore a large-scale reaction vessel are required, so that the upper limit of the ammonium salt can be appropriately changed in consideration of the treatment cost.

The reaction temperature of the smelting raw material and the ammonium salt can be appropriately changed in accordance with the boiling point of the ammonium salt used. For example, when ammonium hydrogen sulfate is used as the ammonium salt, it liquefies at approximately 147° C. or higher and starts to react with the smelting raw material, and when it is raised in temperature to approximately 490° C., which is the boiling point, the smelting raw material can be incorporated into the molten substance. When ammonium sulfate is used as the ammonium salt, it liquefies at approximately 120° C. or higher, starts to react with the smelting raw material, changes into ammonium hydrogen sulfate at approximately 350° C., and thereafter, undergoes the same reaction.

As described above, although niobium and tantalum in ore, which is the smelting raw material, coexist while being bonded to each other, the high chemical activity of the thermally decomposed ammonium salt can break the bonds between niobium and tantalum and change them into a chemical form that is soluble also in general acids other than hydrofluoric acid.

Unreacted ammonium salt and impurities remain in the molten substance formed by the reaction with the ammonium salt. Therefore, by adding a predetermined amount of aqueous solution to the molten substance to form a suspension, it becomes easier to remove these impurities and the like. The aqueous solution is added about one or more times the weight of the molten substance as a guide. For example, when ammonium hydrogen sulfate or ammonium sulfate is used as the ammonium salt, the remaining ammonium salt and impurities can be completely dissolved by adding the aqueous solution of about one or more times the weight of the molten substance in consideration of the saturation solubility of these ammonium salts, the volatilization amount by heating, or the decomposition amount of the smelting raw material.

The aqueous solution to be used can be appropriately selected from distilled water, pure water, ion exchanged water, tap water, and the like to be used. Further, dilute acids can be used as solvents.

The suspension formed by adding the aqueous solution to the molten substance is separated into a liquid and a precipitate containing niobium and tantalum by solid-liquid separation. Here, the solid-liquid separation method can be appropriately selected from known solid-liquid separation methods such as a filtration method, a pressure method, and a centrifugal separation method.

The precipitate is composed of nearly pure niobium and tantalum containing almost no impurities and becomes a compound that can be dissolved in general acids other than hydrofluoric acid by bonding with acid ions. Here, as the acid used for dissolution, for example, high-concentration hydrochloric acid, sulfuric acid, nitric acid, or the like can be used. Further, even when hydrofluoric acid is used, the precipitate can be easily acid-dissolved in a very small amount of hydrofluoric acid as compared with the prior art. Thus, there is no need to use hydrofluoric acid, which has a high scarcity value, in a large amount.

The precipitate obtained by the solid-liquid separation of Step 4 may be once heated, and the heated substance obtained by the heating may be provided for Step 5. At this time, impurities such as sulfur and ammonia contained in the precipitate are removed by heating, so that the obtained heated substance is composed of niobium and tantalum with higher purity. At this time, the heated substance is an oxide and thus reacts with only hydrofluoric acid as the acid solution. However, the impurities have been removed as described above, so that the heated substance can be easily acid-dissolved in a very small amount of hydrofluoric acid.

The aqueous solution containing the acid-dissolved niobium and tantalum can be subjected to mutual separation and reduction in the subsequent smelting process, and can be processed into products such as metals, oxides, and fluorides.

Next, an example of the present invention will be described.

<Formation of Mixture>

0.05 to 0.3 g of powdered ammonium hydrogen sulfate was placed in a test tube with respect to 0.01 g of powdered columbite ore pulverized to approximately 32 μm or less as the smelting raw material to form a mixture (FIG. 2).

<Formation of Molten Substance>

The test tube was attached to an evaporator, and a bottom portion of the test tube was heated with a gas burner for about 7 minutes while rotating the test tube at a speed of 100 rpm. Since the melting point of ammonium hydrogen sulfate is approximately 147° C., the mixture in the test tube quickly became a molten substance by heating (FIG. 3). When exposed to room temperature, the molten substance becomes a solid substance after a certain period of time.

<Formation of Suspension>

An aqueous solution (ion exchanged water in the example of the present invention) of about twice the weight of the solid substance into which the molten substance has been solidified was placed in a test tube and thoroughly stirred. At this time, unreacted ammonium hydrogen sulfate and impurities remaining in the solid substance were dissolved into the aqueous solution, and a suspension in which white particulates were suspended was formed (FIG. 4).

<Solid-Liquid Separation of Suspension>

The suspension was subjected to solid-liquid separation by centrifugation, whereby a white precipitate was recovered (FIG. 5).

<Acid Dissolution of White Precipitate>

The white precipitate obtained by the solid-liquid separation was easily dissolved to form a solution, when put into a high-concentration hydrochloric acid.

<Measurement of Solution>

The results of measuring the concentration of niobium and tantalum in the solution formed by the acid dissolution with an ICP emission spectrometer are shown in FIG. 6.

As shown in FIG. 6, when ammonium hydrogen sulfate of less than 10 times the weight of columbite ore was mixed and reacted, the dissolution rate of niobium and tantalum becomes around 60%. On the other hand, when ammonium hydrogen sulfate of 10 or more times the weight of columbite ore was mixed and reacted, it was confirmed that 90% or more of niobium and tantalum could be dissolved.

As described above, the method for liquefying niobium and tantalum and the method for producing a niobium solution and a tantalum solution according to the present invention can liquefy niobium and tantalum or produce a niobium solution and a tantalum solution safely and efficiently from a smelting raw material containing niobium and tantalum.

The invention claimed is:

1. A method for liquefying niobium or tantalum comprising the steps of:
   forming a molten substance by making a mixture of an ammonium salt and a powdered substance containing at least one element of niobium or tantalum;
   dissolving the molten substance, which has been solidified, in a predetermined amount of solvent to form a suspension;
   subjecting the suspension to solid-liquid separation into a precipitate and a liquid; and
   dissolving the precipitate by reaction with an acid solution.

2. The method for liquefying niobium or tantalum according to claim 1, wherein in the step of forming the molten substance, the ammonium salt is in a powder form.

3. The method for liquefying niobium or tantalum according to claim 1, wherein in the step of forming the molten substance, the ammonium salt is in a molten form.

4. The method for liquefying niobium or tantalum according to claim 1, wherein in the step of forming the molten substance, the ammonium salt is in a weight ratio of about twice or more relative to the powdered substance.

5. The method for liquefying niobium or tantalum according to claim 1, wherein in the step of forming the molten substance, the mixture is heated for a predetermined period of time so that a temperature of the molten substance reaches about 400 to 500° C.

6. The method for liquefying niobium or tantalum according to claim 1, wherein in the step of dissolving the molten substance, the solvent is an aqueous solution weighing about one or more times a weight of the molten substance.

7. The method for liquefying niobium or tantalum according to claim 1, wherein the ammonium salt is at least one selected from ammonium hydrogen sulfate, and ammonium sulfate.

8. The method for liquefying niobium or tantalum according to claim 1, wherein the acid solution is at least one selected from hydrochloric acid, sulfuric acid, nitric acid, and hydrofluoric acid.

9. The method for liquefying niobium or tantalum according to claim 1, further comprising a step of heating the precipitate to a predetermined temperature to obtain a heated substance after the step of subjecting the suspension and before the step of dissolving the precipitate, wherein
    the step of dissolving the precipitate includes a step of dissolving the heated substance with hydrofluoric acid.

* * * * *